United States Patent [19]

Lawson, II

[11] 4,197,532

[45] Apr. 8, 1980

[54] ELECTRONIC MOTOR FAULT DETECTOR MEANS

[75] Inventor: Phillip N. Lawson, II, Anoka, Minn.

[73] Assignee: Honeywell Inc., Minneapolis, Minn.

[21] Appl. No.: 900,444

[22] Filed: Apr. 27, 1978

[51] Int. Cl.² ............................................. G08B 21/00
[52] U.S. Cl. .................................... 340/648; 340/663; 361/33
[58] Field of Search ................... 340/648, 663; 361/33

[56] References Cited

U.S. PATENT DOCUMENTS

| | | | |
|---|---|---|---|
| 3,321,754 | 5/1967 | Grimm et al. | 340/663 |
| 3,334,342 | 8/1967 | Blackman | 340/648 |
| 3,427,507 | 2/1969 | Brown | 361/24 |
| 3,505,663 | 4/1970 | Yule | 340/663 |
| 3,611,036 | 10/1971 | Edson | 340/648 |
| 3,794,989 | 2/1974 | Manley et al. | 340/571 |
| 3,820,099 | 6/1974 | Vogt | 340/661 |
| 3,854,089 | 12/1974 | Emler | 340/663 |
| 3,950,675 | 4/1976 | Weber et al. | 361/33 |
| 4,027,204 | 5/1977 | Norbeck | 361/1 |
| 4,040,117 | 8/1977 | Houser | 361/33 |

*Primary Examiner*—Glen R. Swann, III
*Attorney, Agent, or Firm*—Alfred N. Feldman

[57] ABSTRACT

The voltage that occurs across the run capacitor of a permanently split capacitor type motor when the motor is in operation is quite high compared to the voltage that is present if the motor is stalled. These different voltage conditions are sensed through the use of a voltage pickoff to control an optical type isolation circuit which in turn controls a switch means to energize a fault indicator.

3 Claims, 1 Drawing Figure

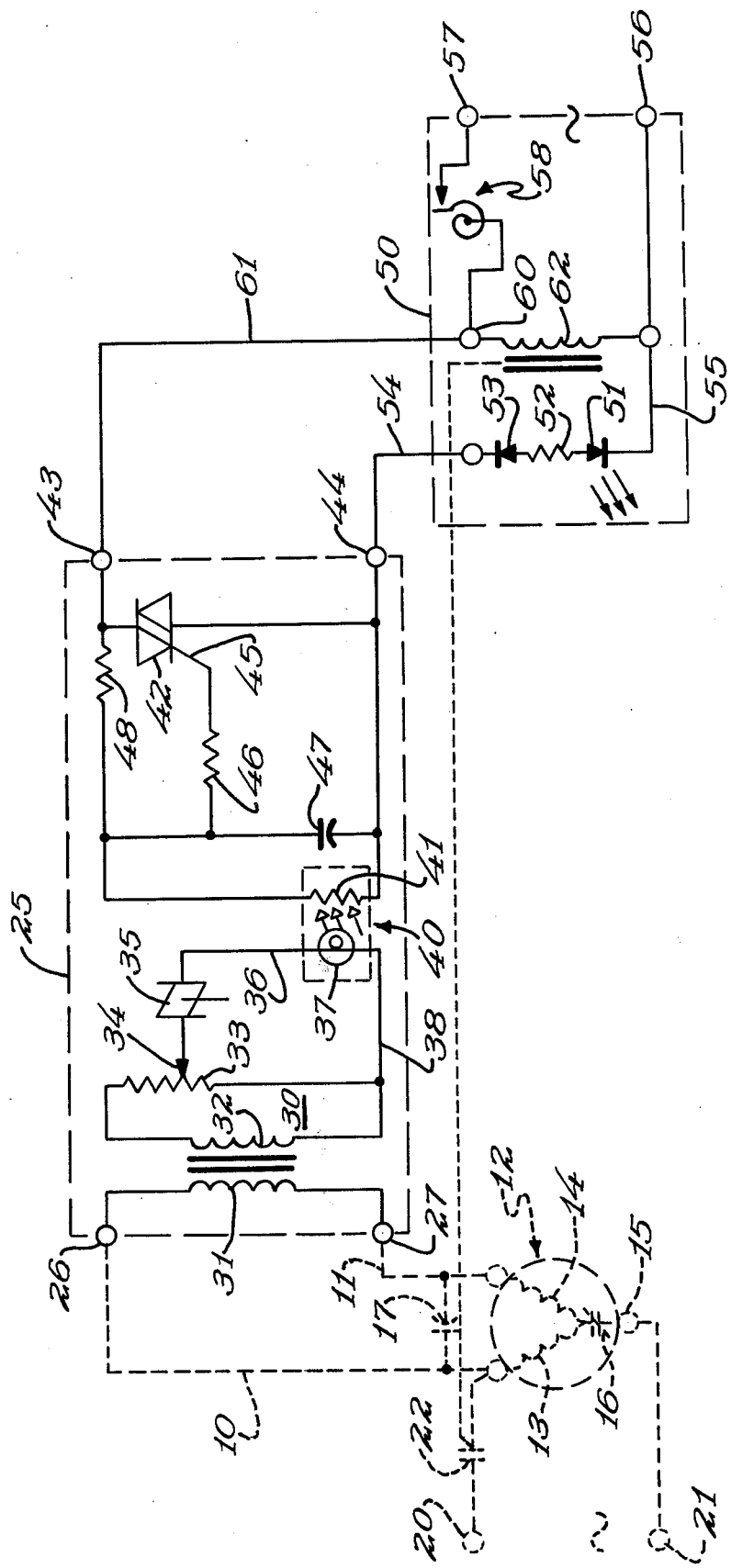

ELECTRONIC MOTOR FAULT DETECTOR MEANS

BACKGROUND OF THE INVENTION

In the operation of air conditioning systems and many types of refrigeration systems, the electric motor that is used to drive the refrigeration compressor is located remotely from an area that would normally be monitored or occupied. In this type of a situation, a motor failure, such as a stalled motor or a motor with an open winding, can go undetected for quite a long period of time. In refrigeration equipment used for cooling and storage of food and other perishables, the long interval of time between a compressor motor failure and the realization that such a failure has occurred can be very costly. In the failure of air conditioning equipment, the failure to promptly service equipment can lead to considerable inconvenience.

In many air conditioning and refrigeration systems it has been found possible to connect an electromagnetically operated relay across the run capacitor of a permanently split capacitor run type of motor for use in indicator or fault detection equipment. If an electromagnetically operated relay is connected across the run capacitor, a voltage change that appears across this capacitor during the normal run condition and a fault condition can be used in some installations to indicate the existence of a fault or improper operation. The difficulty in using a relay is that while the relay will pull-in at a well defined voltage, the dropout voltage of a conventional electromagnetic relay creates a problem in possibly not indicating one type of compressor motor fault. If the run winding of a permanently split capacitor motor that is being monitored by a relay opens while the motor is in operation, a voltage across the run capacitor will result from the resonant circuit formed by the run capacitor and the starting winding. If a relay is used as a detector in this type of a situation, the resonant voltage will not allow the relay to drop out, therefore, not indicating a fault. The wide differential in the pull-in and dropout characteristics of a conventional electromagnetic type relay, therefore, makes its use of limited value.

SUMMARY OF THE INVENTION

The present invention is directed to a fault detector that utilizes a voltage pickoff arrangement connected across the run capacitor of a motor such as a permanently split capacitor type of motor. The voltage pickoff means operates through a voltage breakdown device, such as a solid state bilateral switch or similar unit, to control the energy to a light generating means. This light generating means can be of any type such as a conventional incandescent lamp, a neon lamp, or a light emitting diode. The light from this source is then coupled to a light responsive circuit means that through the use of electronics can provide for remote indication of a fault. Due to the nature of the voltage breakdown device and the light generating means, a very small differential in operating voltage between the fault and no-fault condition can be selected. If necessary, this operating differential can be in the order of a volt or two. This makes the present system sensitive to fault conditions that could not be detected by the use of an electromagnetic type of relay.

In the present invention a very simple arrangement of voltage pickoff means and light generating source in an optical isolation device is used to control a solid state switch, in the form of a triac. The operation of the triac in turn is used to control energy to an indicator in the form of a light emitting diode. The entire system is exceedingly simple and is relatively inexpensive. The system can use low voltage wiring and thereby provide for remote indication with a minimum of expense and installation, and with a high degree of safety and reliability.

BRIEF DESCRIPTION OF THE DRAWING

The single FIGURE shows a schematic arrangement of a fault detector connected to the run capacitor of a permanently split capacitor type motor.

DESCRIPTION OF THE PREFERRED EMBODIMENT

In the single embodiment of the invention disclosed in the drawing, the fault detector means is shown as adapted to be connected by a pair of conductors 10 and 11 to a permanently split capacitor type motor generally disclosed at 12. The permanently split capacitor motor 12 is a type of motor extensively used in refrigeration and air conditioning applications to drive a refrigeration compressor. The motor 12 normally contains a run winding 13 and a start winding 14 that are connected to a common terminal 15 through an internal temperature overload or circuit breaker device 16. Connected between the run winding 13 and the start winding 14 is a run capacitor 17. The run capacitor 17 is, therefore, connected between the conductors 10 and 11.

The motor 12 is normally energized from a pair of line voltage terminals 20 and 21. The line voltage terminal 20 is connected through a contactor terminal 22 to the run winding 13 at a motor terminal that is common to the conductor 10 and the run capacitor 17. The remaining line voltage terminal 21 is connected directly to the terminal 15. To this point, a conventional motor and control circuit have been described. This type of motor is known to have a relatively high voltage appearing across the capacitor 17 when the armature of the motor is rotating to thereby generate a back electromagnetic force. In the event that the run winding 13 should open during operation, or if the motor refuses to start due to some fault, the voltage appearing across the capacitor 17 is substantially reduced from that which would appear across the capacitor 17 if the motor were operating normally. This difference in voltage between the normal run condition and a failure condition is sensed by means of the conductors 10 and 11 by the fault detector means that will now be described.

The novel fault detector means is disclosed as made of two generally separate units. The first unit is a light responsive circuit means 25 which has a pair of terminals 26 and 27 that are connected to the conductors 10 and 11. Between the terminals 26 and 27 there is connected a voltage pickoff means generally disclosed at 30. The voltage pickoff means 30 includes a transformer primary winding 31 and a secondary winding 32. The transformer windings 31 and 32 form a step-down ratio thereby reducing the relatively high voltage which appears across the primary 31 to a relatively low voltage appearing across the secondary winding 32. The secondary winding 32 is paralleled by a resistance element 33 of a potentiometer that includes a wiper 34. It should be understood that the transformer windings 31 and 32 and the potentiometer and wiper 34 could be replaced by a simple voltage divider network having the potentiometer wiper 34 as one of its elements. The use of the transformer arrangement disclosed is desirable as a voltage isolation means and as a further expedient to carefully select the amount of voltage that appears at the wiper 34.

The wiper 34 is connected to a voltage breakdown means generally disclosed at 35 as a solid state breakdown switch. The voltage breakdown means 35 could be any type of voltage breakdown element to establish a voltage differential in a circuit which is completed by the conductor 36 through a light generating means 37 to the conductor 38 which in turn is connected back to the resistance 33. The light generating means 37 has been disclosed as a conventional incandescent light source, but it could be any type of light generating means such as a light emitting diode, neon or other type of light emitting element that is capable of generating a light output when a voltage appears between the wiper 34 and the conductor 38. In the embodiment disclosed the light generating means 37 is part of an optical isolator generally disclosed at 40 and which further includes a light responsive resistance element 41 that changes from a relatively high resistance when no light is present to a relatively low resistance when light is emitted from the light generating means 37. The optical isolator 40 provides two distinct functions. The first function is its control function in altering the resistance value of the resistor 41, and also simultaneously providing a complete electrical isolation between two parts of the light responsive circuit means 25. Since the present disclosure utilizes a step-down transformer 30 in the voltage pickoff means, the voltage isolation in the optical isolator 40 acts merely as an additional safety. In the event that the voltage pickoff means were a voltage divider network connected directly across the conductors 10 and 11, the optical isolator 40 would be an important element to provide isolation between the relatively high voltage section of the light responsive circuit means 25 and a low voltage section that will now be described.

The light responsive circuit means further includes a solid state switch means 42 connected across a pair of terminals 43 and 44. The solid state switch means has been disclosed as a triac with the triac connected directly across the terminals 43 and 44 and further including a gate means 45. The gate means 45 is connected through a resistor 46 to a capacitor 47 that is connected in parallel with the light responsive resistor 41. A further resistor 48 is provided between this parallel combination and the terminal 43.

The solid state switching portion of the light responsive circuit means 25 will now briefly be explained. If it is understood that a low voltage potential is available at the terminals 43 and 44, it will be apparent that this potential will effectively be short circuited when the resistor 41 is at a relatively low level, as when light is present from the light generating means 37. This effectively keeps the triac 42 in a nonconductive state as there is an insufficient voltage to gate the triac 42 into conduction. If the light generating means 37 has no output, the resistor 41 has a relatively high resistance, thereby allowing a substantial amount of voltage to appear through the resistor 46 on the gate 45 of the triac 42. The triac is then gated into conduction and substantially shorts the terminals 43 and 44. The two states of operation, that is with the triac 42 either conducting or not conducting provides for the fault detector indicating means operation. That operation will be described after the indicator means portion of the circuit which has not yet been described is explained.

The balance of the circuitry is made up by an electrically energizable control means generally disclosed at 50. The electrically energizable control means 50 includes an indicator means 51 in the form of a light emitting diode that acts as the indicator means. In order to make a light emitting doide functional in this particular circuit a conventional resistor 52 and a further diode 53 are provided and are connected to a conductor 54 that is connected in turn to the terminal 44 of the light responsive circuit means 25. The light emitting diode 51 is further connected to a conductor 55 that is further connected to a terminal 56 that is supplied by a conventional source of power between the terminal 56 and a further terminal 57. The terminal 57 is connected through an ordinary thermostat generally disclosed at 58. The thermostat 58 is connected in turn to a terminal 60 that is available to supply energy via conductor 61 to the terminal 43. Between the terminal 60 and the conductor 55 is connected a coil 62 of an electromagnetic contactor that is used to control the compressor motor 12. The electromagnetic coil 62 acts to control the contact 22 in a conventional fashion.

OPERATION

The operation of the circuit will now be briefly described. If the thermostat 58 closes, electrical energy is immediately supplied across the contactor coil 62 to close the contacts 22. This immediately applies the necessary potential to the motor 12 to cause it to operate. If the motor 12 starts in a normal manner, a relatively high voltage will appear across the capacitor 17. This voltage is picked off by the voltage pickoff means 30 where a voltage is derived at the wiper 34 and is supplied across the voltage breakdown means 35 to the light generating means 37. The light generating means 37 provides light to the light responsive resistance means 41 and the resistance means drops to a low value. The low value substantially shorts out the gating potential for the triac 42 and the triac 42 does not conduct. If the triac 42 is in a nonconducting state, there is an insufficient voltage between the conductors 61 and 54 to cause the light emitting diode 51 to conduct in view of the diode 53 and the voltage dropping resistor 52. It should be further understood that the light emitting diode 51 or indicator could be in series with conductor 61 as opposed to the conductor 54. Since the voltage between the conductor 61 and 54 is insufficient to cause the light emitting diode 51 to generate any light, the overall fault detector indicates that the compressor motor 12 is operating normally.

One of the typical types of failures of the type of motor arrangement disclosed is the failure of the compressor motor to rotate and generate a back electromagnetic force. This can happen due to a mechanical failure, a temperature overload condition, or an open circuit of one of the windings. In any of these cases, the run capacitor $1^7$ has a relatively low voltage available when the motor is required to operate, but has failed to operate properly. This relatively low value of voltage is picked off by the voltage pickoff means 30 and provides a relatively low value of voltage at the wiper 34. The wiper 34 has been adjusted during normal operation so that this relatively low value of voltage does not break down the voltage breakdown means 35 and no light is generated by the light generating means 37. The failure of light to be generated by the light generating means 37 causes the resistor 41 to have no light falling thereon, and the resistance 41 is a relatively high value. This relatively high value allows the potential supplied between the terminals 43 and 44 to build up a sufficient gating voltage through the resistor 46 and the capacitor 47 to the gate 45 of the triac 42. This causes the triac 42 to conduct readily and provides a current in the conductor 54 through the light emitting diode 51 thereby causing the light emitting diode 51 to indicate that a fault has occurred.

For normal operations, indicator diode 51 will emit light for approximately one-half seconds, during motor start-up, while voltage is established across run capacitor 17 and switching, of light response means 25 occurs. This provides a means of assuring an observer that the fault system is in correct working order.

Both the normal state of operation and a fault mode of operation of the fault detector means has been described. It should be noted that the light responsive circuit means 25 can readily be mounted at the compressor motor 12 and would only have a pair of low voltage conductors 54 and 61 connected back to the electrically energizable control means 50. This electrically energizable control means generally would be the thermostat in a controlled space and since it was supplied by a low voltage on conductors 61 and 54 a normal type of thermostat or control installation would be available. The light responsive circuit means 25 and the electrically energizable control means 50 could be mounted together if that were desirable. The present arrangement provides for a large degree of flexibility. Also, it is quite obvious from the description that a number of different types of light generating means and detectors, as well as a large number of different types of indicating devices, could be used with the present invention. For that reason, the applicant wishes to be limited in the scope of his invention solely by the scope of the appended claims.

The embodiments of the invention in which an exclusive property or right is claimed are defined as follows:

1. A fault detector means adapted to be connected to a capacitor which is used to start an electric motor having a run winding and a start winding, including: voltage pickoff means adapted to be connected to said capacitor to detect a voltage across said capacitor; said pickoff means including stepdown transformer means with a high voltage primary winding adapted to be connected across said capacitor, and low voltage secondary means having adjustable output means; voltage breakdown means connected to said adjustable output means and to light generating means to provide said light generating means with an operating threshold defined by said voltage breakdown means; said light generating means providing a light output whenever said capacitor has a high voltage wherein said threshold is exceeded thereby indicating that said motor has an energizing potential applied thereto and that said motor is rotating; light responsive circuit means including a light responsive resistor responding to said light generating means but electrically isolated from said light generating means; said resistor having a high resistance when light is absent and having a low resistance when light is present; electrically energizable control means for said motor; and indicator means connected to said light responsive circuit means and energized concurrently with said electrically energizable control means; said indicator means indicating a fault condition when said electrically energizable control means calls for said motor to be energized and said light generating means has no light output thereby causing said light responsive resistor to have said high resistance.

2. A fault detector means as described in claim 1 wherein said light responsive circuit means includes a gated solid state switch with said light responsive resistor connected to control a voltage at a gate of said switch.

3. A fault detector means as described in claim 2 wherein said voltage pickoff adjustable output means includes an adjustable voltage divider.

* * * * *